Figure 1:
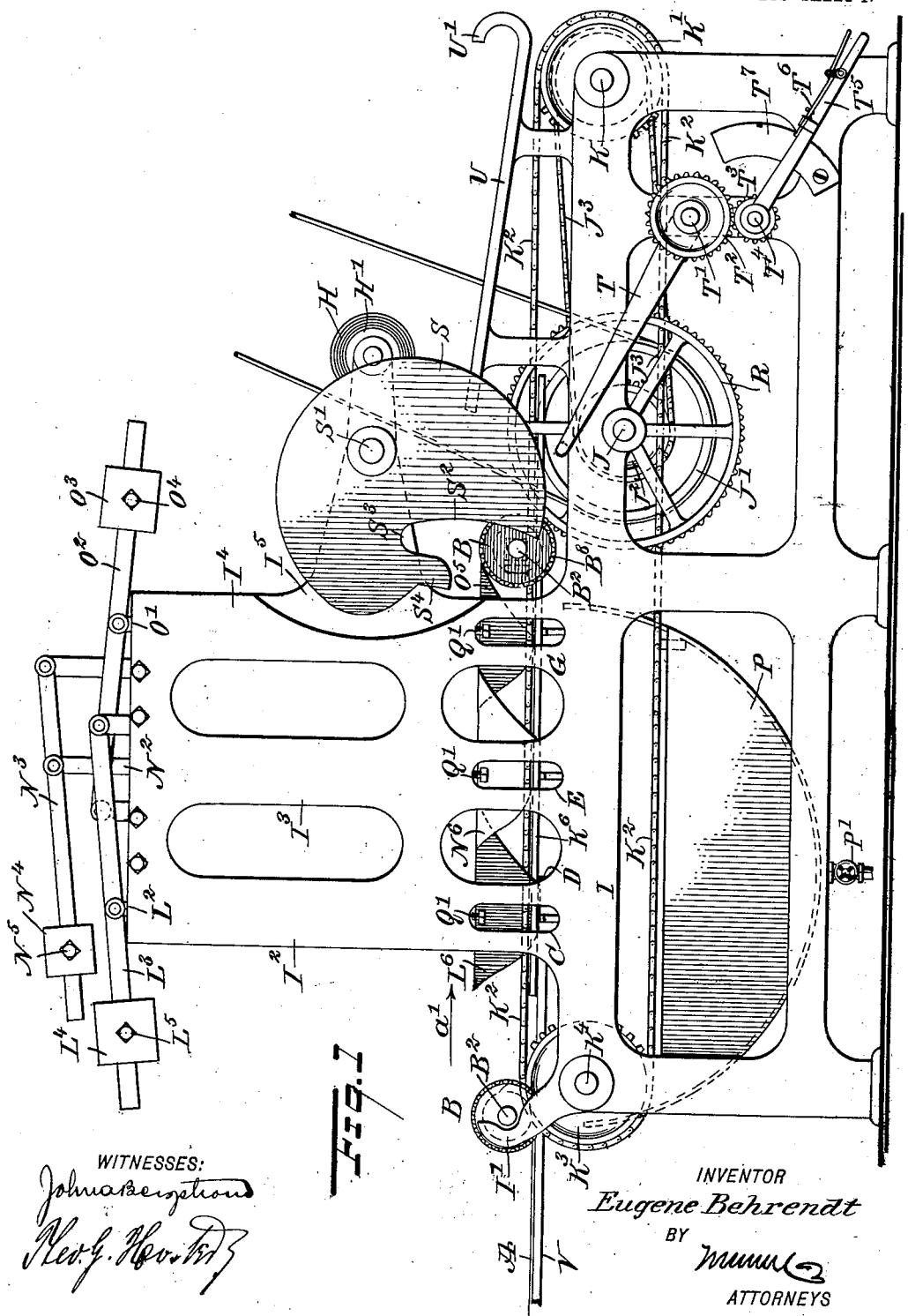

No. 868,525. PATENTED OCT. 15, 1907.
E. BEHRENDT.
MACHINE FOR SEPARATING FIBERS FROM THE PULP AND EXTRANEOUS MATTER OF PLANTS AND TREES.
APPLICATION FILED NOV. 13, 1905.

5 SHEETS—SHEET 1.

WITNESSES:

INVENTOR
Eugene Behrendt
BY
ATTORNEYS

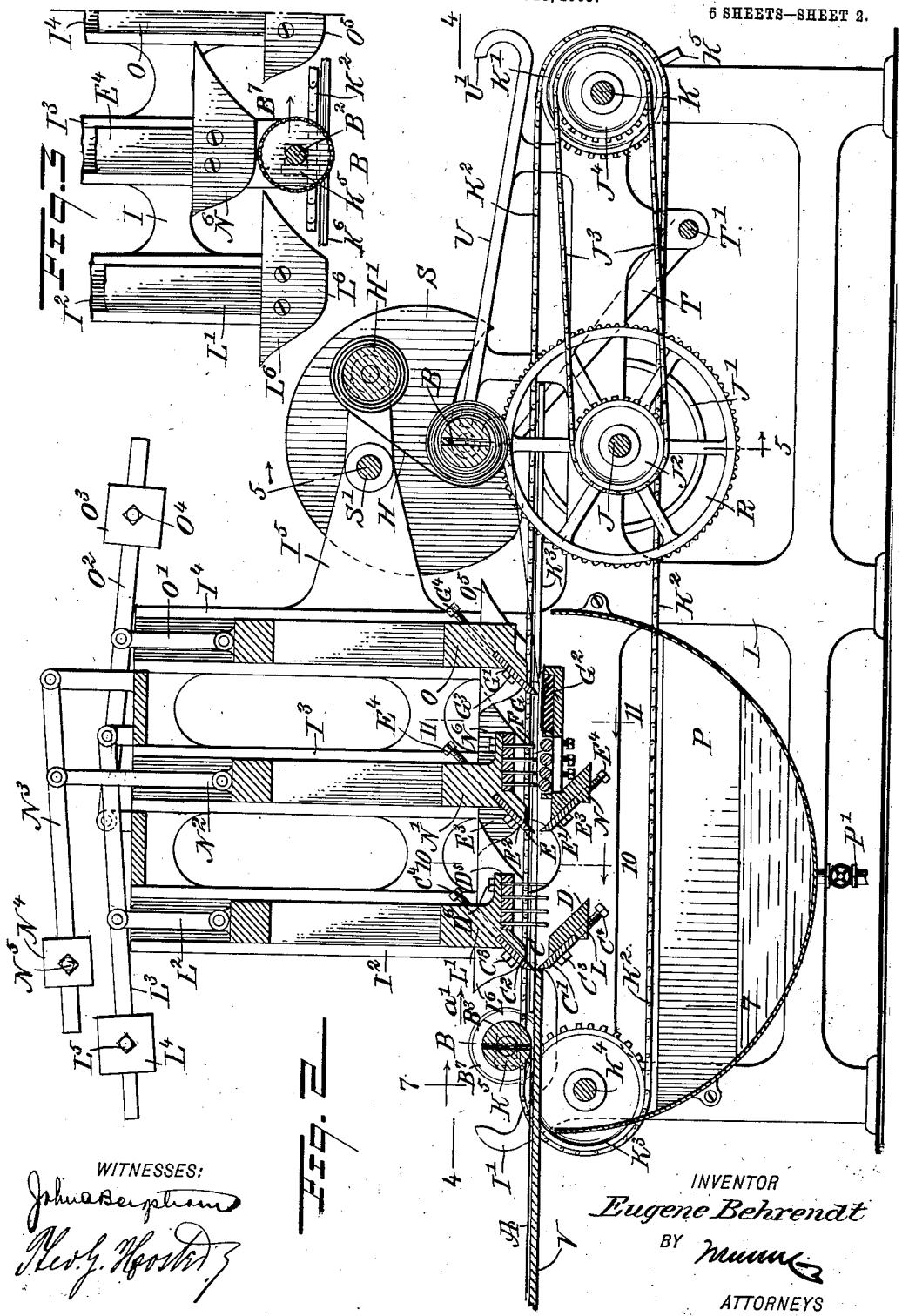

No. 868,525. PATENTED OCT. 15, 1907.
E. BEHRENDT.
MACHINE FOR SEPARATING FIBERS FROM THE PULP AND EXTRANEOUS MATTER OF PLANTS AND TREES.
APPLICATION FILED NOV. 13, 1905.
5 SHEETS—SHEET 3.
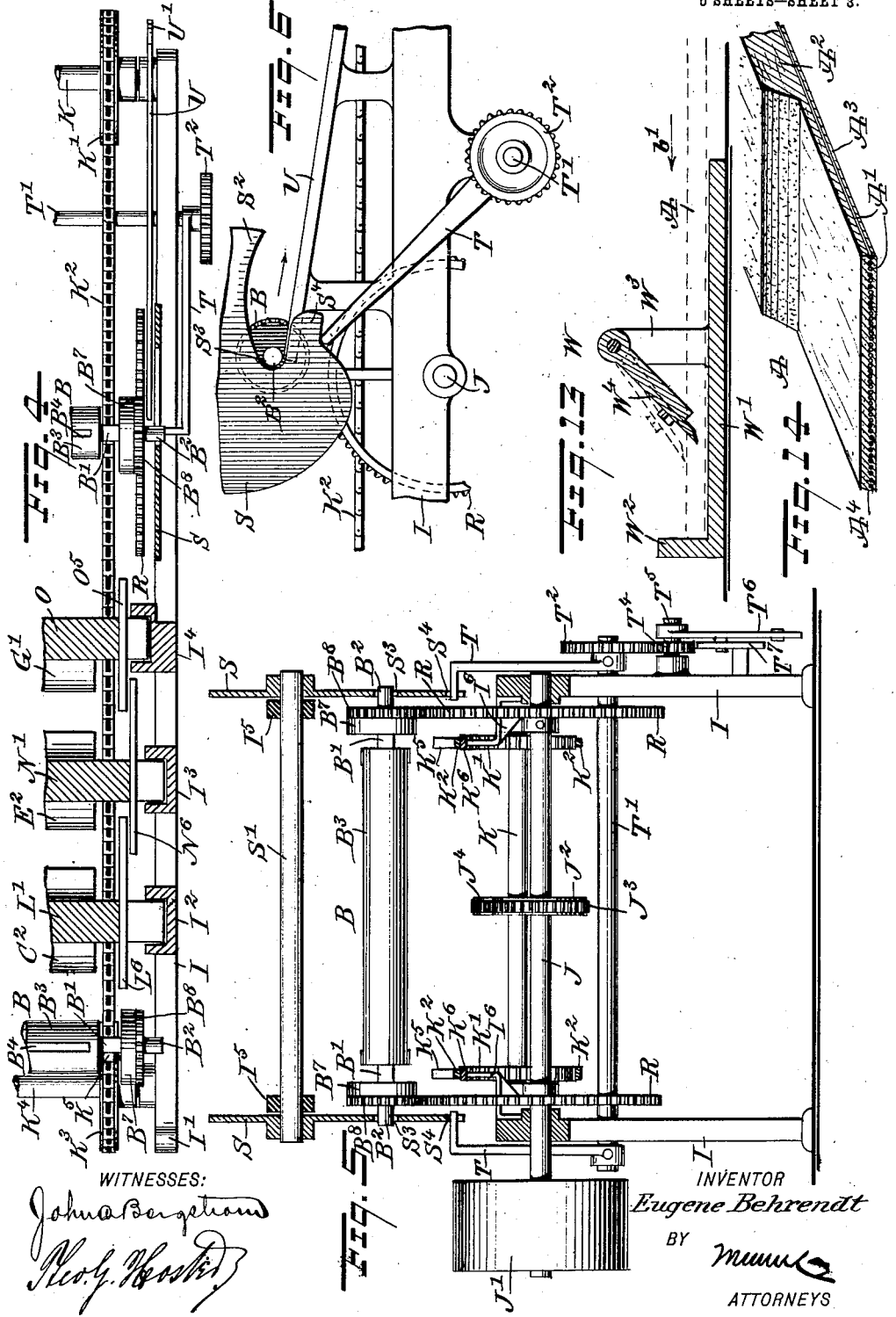
WITNESSES:
INVENTOR
Eugene Behrendt
BY
ATTORNEYS No. 868,525. PATENTED OCT. 15, 1907.
E. BEHRENDT.
MACHINE FOR SEPARATING FIBERS FROM THE PULP AND EXTRANEOUS MATTER OF PLANTS AND TREES.
APPLICATION FILED NOV. 13, 1905.
5 SHEETS—SHEET 4.
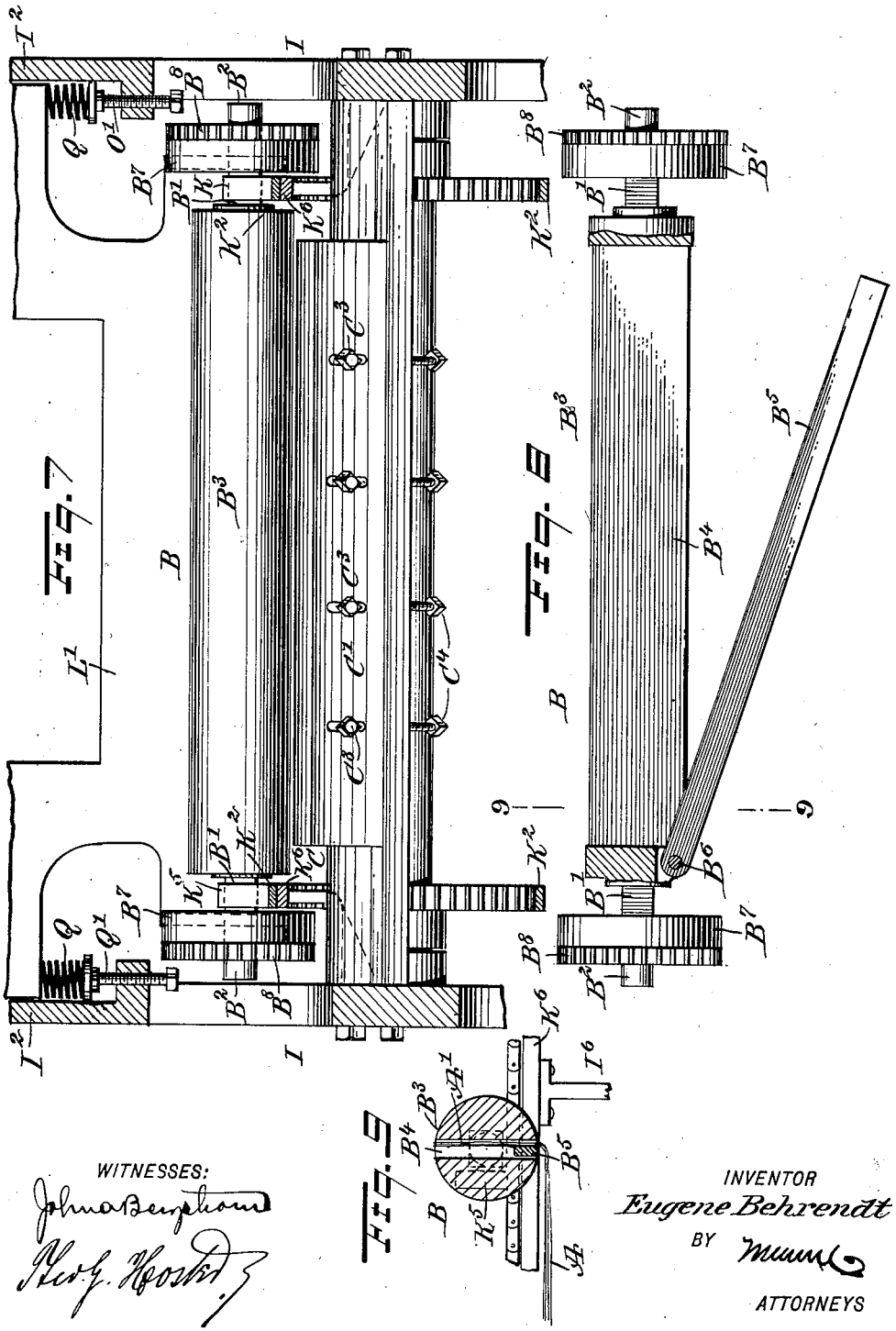

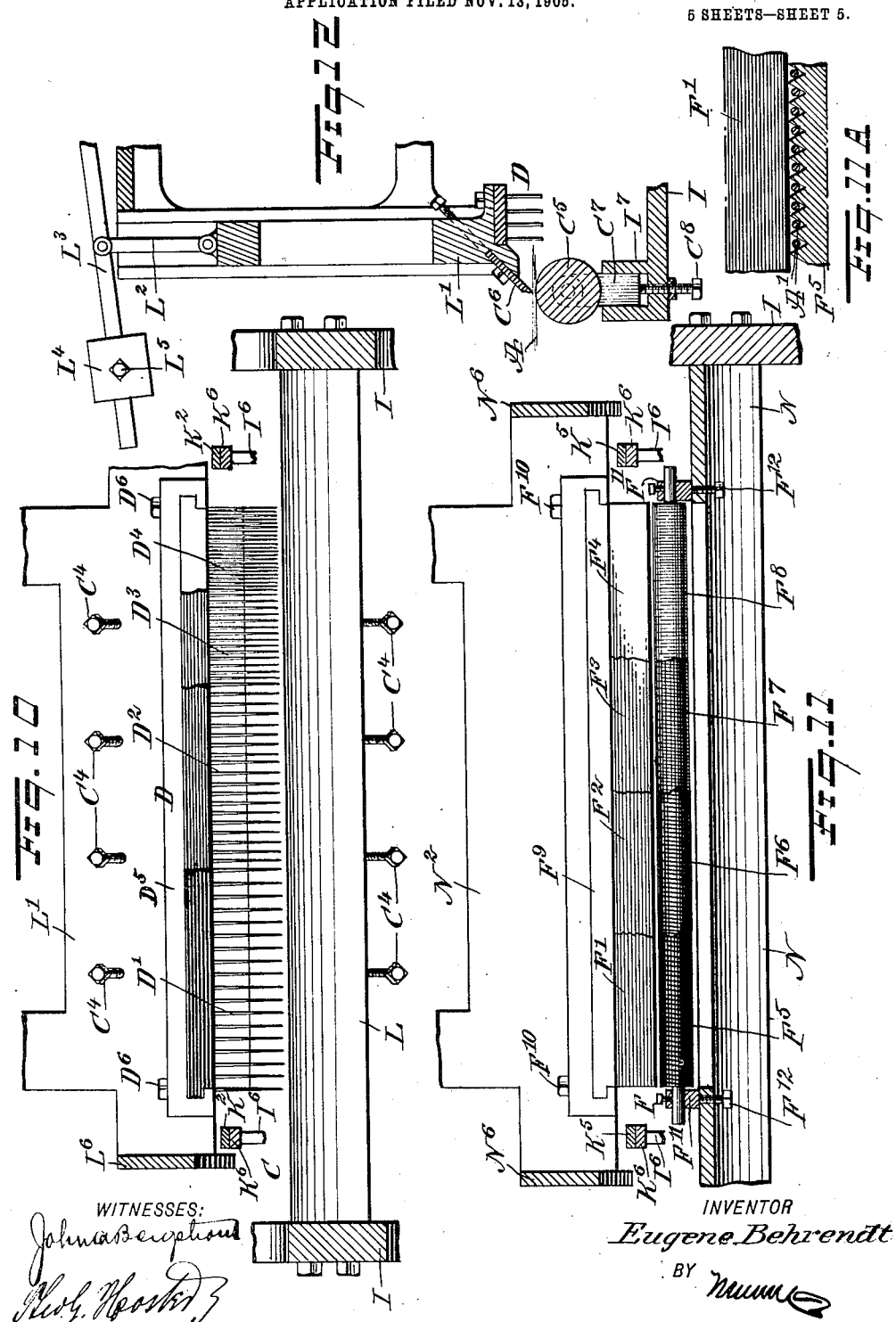

UNITED STATES PATENT OFFICE.

EUGENE BEHRENDT, OF MANILA, PHILIPPINE ISLANDS, ASSIGNOR TO BEHRENDT & CO., OF NEW YORK, N. Y., A CORPORATION OF NEW YORK.

MACHINE FOR SEPARATING FIBERS FROM THE PULP AND EXTRANEOUS MATTER OF PLANTS AND TREES.

No. 868,525.      Specification of Letters Patent.      Patented Oct. 15, 1907.

Application filed November 13, 1905. Serial No. 287,065.

*To all whom it may concern:*

Be it known that I, EUGENE BEHRENDT, a citizen of the United States, and a resident of Manila, Philippine Islands, have invented a new and Improved Machine for Separating Fibers from the Pulp and other Extraneous Matter of Plants and Trees, of which the following is a full, clear, and exact description.

The invention relates to brakes employed for separating fibers from the pulp or extraneous matter of the bark or leaf sheaths of the tropical abaca (*Musa textilis*) and other plants and trees, especially such as the abaca which yields manila hemp, to be manufactured into rope or cordage, the present machine being an improvement on the machine shown and described in the applications for Letters Patent of the United States for hemp stripping and cleaning machines, Serial Nos. 251,246 and 270,422, filed by me March 21, 1905, and July 19, 1905, respectively.

The object of the invention is to provide a new and improved machine for separating the fibers from the extraneous matter or pulp and other extraneous matter in a very simple, effective and economic manner and without danger of undue injury to the fibers, the latter being properly straightened, cleaned, polished and rendered free from gum and like substances.

The invention consists of novel features and parts and combinations of the same which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement; Fig. 2 is a longitudinal sectional elevation of the same; Fig. 3 is a side elevation of the means for raising the movable members of the stripping devices, combing device, cleaning and polishing device and drying device for the passage of the draw-head employed for drawing the material between the members of the said devices; Fig. 4 is a sectional plan view of the improvement, on the line 4—4 of Fig. 2; Fig. 5 is a cross section of the same, on the line 5—5 of Fig. 2; Fig. 6 is a side elevation of the mechanism for raising the draw-head out of gear; Fig. 7 is an enlarged cross section of the improvement, on the line 7—7 of Fig. 2; Fig. 8 is a longitudinal sectional elevation of the draw-head or carrier; Fig. 9 is a sectional side elevation of the same, and the means for moving the draw-head along; Fig. 10 is an enlarged cross section of the improvement, on the line 10—10 of Fig. 2, showing more particularly the combing device and part of the first stripping device; Fig. 11 is a like view of the same, on the line 11—11 of Fig. 2; showing more particularly the final cleaning and polishing device; Fig. 11$^a$ is an enlarged cross section of the same; Fig. 12 is a sectional side elevation of the stripping device as arranged for treating material having very fine fibers; Fig. 13 is a sectional side elevation of the device for reducing one end of the material for convenient attachment to the draw-head; and Fig. 14 is an enlarged sectional perspective of the material, showing the reduced clamping portion.

The machine presently described in detail is more especially designed for treating the leaf sheaths or band-like material A stripped off the abaca and like plants, the said leaf sheath material A consisting of lengthwise extending fibers A' (see Fig. 14) embedded in a sappy pulp $A^2$ of a spongy character, and covered at one side by a hard, tenacious and exceedingly smooth covering $A^3$. With my machine the fibers are separated not only from the pulp $A^2$, but also from the covering $A^3$, and at the same time the fibers are separated from each other, cleaned, polished, dried and kept smooth and separate and free from entanglement.

The reduced end $A^4$ of the material A is secured in a draw-head B adapted to be moved lengthwise of the machine in the direction of the arrow $a'$ for drawing the material A successively through a stripping device C, a combing device D, a second stripping device E, a cleaning and polishing device F, and a scraping and drying device G, to finally wind up the separate, cleaned, polished and dried fibers on the draw-head B, together with an apron H of cloth or other material, to prevent the fibers from kinking, curling up or entangling during the winding up or spooling process.

The several devices mentioned are mounted on a suitably constructed frame I, in which is journaled a transversely-extending driving shaft J provided with a pulley J' connected with other machinery for imparting a rotary motion to the driving shaft J. On the latter is secured a sprocket wheel $J^2$ connected by a sprocket chain $J^3$ with a sprocket wheel $J^4$ secured on a transverse shaft K journaled in suitable bearings on the main frame I at the rear end thereof. Now, when the main shaft J is rotated, a rotary motion is transmitted by the sprocket wheels $J^2$, $J^4$, and the sprocket chain $J^3$, to the shaft K.

On the shaft K are secured sprocket wheels K' located near the sides of the main frame I and forming part of a chain conveyer having the endless sprocket chains $K^2$ passing over the said sprocket wheels K' and also over similar sprocket wheels $K^3$ secured on a transverse shaft $K^4$ journaled in suitable bearings on the front end of the main frame I.

On the sprocket chains $K^2$ are secured sets of arms $K^5$, each set being adapted to engage the polygonal portions B' of trunnions $B^2$ projecting from the ends of a roller $B^3$ of the draw-head B so as to carry the drawhead B bodily along in the direction of the arrow $a'$ when the machine is in operation.

The roller $B^3$ (see Figs. 8 and 9) is provided with a diametrical slot $B^4$, into which is passed the reduced end $A^4$ of the material A to be treated, the said reduced end $A^4$ being formed by cutting off a portion of the pulp $A^2$ with a knife, the said reduced end $A^4$ being clamped in place in the roller $B^3$ by a clamping bar $B^5$ hinged at $B^6$ to one end of the roller $B^3$. Thus when the clamping bar $B^5$ is in an open position, the reduced end $A^4$ of the material A can be conveniently passed into the slot $B^4$, and then the clamping bar $B^5$ is swung into a closed position, so as to securely clamp the end $A^4$ in position in the roller $B^3$ of the draw-head B. The bar $B^5$ is held in place by friction by being pressed into the slot $B^4$ of the roller against one side of the material. When the end $A^4$ is clamped in position as described, and the draw-head B is placed on the front end of the machine with the trunnions $B^2$ resting in bearings $I'$ of the main frame I, and the machine is started, then a set of arms $K^5$ engage the polygonal portions $B'$ of the trunnions $B^2$, so that the conveyer chain carries the draw-head B bodily along in the direction of the arrow $a'$, to draw the material A through the several devices C, D, E, F and G. The first stripping device C consists essentially of two transversely-extending knives $C'$ and $C^2$ inclined in opposite directions and in the direction of the travel of the material A, the knife $C'$ being attached to a cross bar L secured to the sides of the main frame I, and the knife $C^2$ being secured to a cross head $L'$ mounted to slide up and down in suitable guideways $I^2$ forming part of the main frame I. The upper end of the cross head $L'$ is connected by a link $L^2$ with a lever $L^3$ fulcrumed on the main frame I and carrying a weight $L^4$ adjustably secured on the lever $L^3$ by a set screw $L^5$. By the arrangement described the cross head $L'$ carrying the knife $C^2$ is free to slide up and down in the guideways $I^2$, to allow the draw-head B to pass between the knives $C'$ and $C^2$ at the time the knife $C^2$ and its cross head $L'$ are in a raised position.

The knives $C'$ and $C^2$ are adjustably secured on the cross bar L and the cross head $L'$ by the use of bolts $C^3$ extending through elongated slots in the knives, and screwing in the cross bar L and the cross head $L'$; and proper adjustment of the knives $C'$ and $C^2$ is had by set screws $C^4$ screwing in the cross bar L and cross head $L'$. Thus, by the arrangement described the oppositely-disposed cutting edges of the knives $C'$ and $C^2$ may be brought nearer to or farther from each other, according to the nature of the material under treatment, it being, however, understood that when the draw-head B has passed the cross head $L'$, and the latter moves back to its normal lowermost position, then the knife $C^2$ cuts into the pulp $A^2$ of the material, while the knife $C'$ cuts into the coating $A^3$, so as to remove the main portion of the pulp $A^2$ and the coating $A^3$ as the material A is drawn along between the knives $C'$ and $C^2$. The main result of the action of the stripping device C is the formation of a band of fibers still connected with each other by some of the pulp.

The combing device D, located immediately in the rear of the stripping device C, consists essentially of a series of transversely-extending combs $D'$, $D^2$, $D^3$ and $D^4$, secured to a back $D^5$ fastened to the cross head $L'$ by bolts $D^6$ (see Fig. 10), so that the combing device D moves up and down with the cross head $L'$. The combs $D'$, $D^2$, $D^3$ and $D^4$ are graduated; that is, the teeth in the first comb $D'$ are spaced farther apart than those of the next comb, $D^2$; and the teeth of the latter are spaced farther apart than the teeth of the following comb, $D^3$; and the teeth of the comb $D^4$ are finer than the teeth of the comb $D^3$, as will be readily understood by reference to Fig. 10. Now, when the material is drawn through the machine and the main portion of the pulp $A^2$ and coating $A^3$ is removed by the action of the knives $C'$ and $C^2$, then the band of fibers produced is gradually split into very narrow strips by the teeth of the graduated combs $D'$, $D^2$, $D^3$ and $D^4$, it being understood that the said teeth pass down through the band of fibers on the lowering of the cross head $L'$, and hence when the material is drawn forward the band of fibers is split into narrow strips, each containing a plurality of fibers.

The second stripping device E is similar to the first stripping device C; that is, consists of a fixed knife $E'$ secured to a cross bar N attached to the main frame I, and a knife $E^2$ secured to a crosshead $N'$ mounted to slide vertically in bearings $I^3$ forming part of the main frame I. The cross head $N'$ is connected, at its upper end, by a link $N^2$ with a lever $N^3$ fulcrumed on the main frame I, and provided with a weight $N^4$ adjustably secured on the lever $N^3$ by a set screw $N^5$. The knives $E'$ and $E^2$ are adjustably secured by bolts $E^3$ and $E^4$ to the cross bar N and the cross head $N'$, in the same manner as above described relative to the knives $C'$ and $C^2$, so that further description of the same is not deemed necessary; it being, however, understood that the knives are likewise inclined rearwardly and serve to break up the narrow strips of fibers, with a view to separate the fibers from each other and to remove some of the surplus pulp and other matter from the separated fibers.

The cleaning and polishing device F, located in the rear of the second stripping device E, consists of a series of spaced and transversely-extending plates $F'$, $F^2$, $F^3$ and $F^4$ (see Figs. 2 and 11), operating in conjunction, at their lower ends, with screw rods or notched bars $F^5$, $F^6$, $F^7$ and $F^8$ of different pitch; that is, the first screw rod $F^5$ has a larger pitch than the next following screw rod $F^6$; and the pitch of the screw rod $F^7$ is less than that of the screw rod $F^6$; and the pitch of the screw rod $F^8$ is less than that of the screw rod $F^7$. The plates $F'$, $F^2$, $F^3$ and $F^4$ are secured in a back $F^9$ fastened by bolts $F^{10}$ to the cross head $N'$ so as to move up and down with the latter. The several screw rods or notched bars $F^5$, $F^6$, $F^7$ and $F^8$ are secured in bearings $F^{11}$ adapted to be vertically adjusted by set screws $F^{12}$ screwing in the cross bar N, so as to bring the tops of the screw rods in proper relation to the lower edges of the plates $F'$, $F^2$, $F^3$ and $F^4$. When the fibers are drawn between the plates $F'$, $F^2$, $F^3$ and $F^4$ and their corresponding screw rods or notched bars $F^5$, $F^6$, $F^7$ and $F^8$, it is evident that the fibers are pressed by the plates between the adjacent teeth and notches of the screw rods or bars, so as to cause a thorough cleaning and polishing of the individual fibers, at the same time stripping off any pulp or woody matter that may adhere to the fibers after leaving the second stripping device E.

The scraping or drying device G for removing gum, sap, moisture and the like from the fibers and thereby drying the same consists essentially of a stripping knife G' operating in conjunction with a block G² of rubber or other elastic material and attached to the cross bar N. The knife G' is adjustably secured by bolts G³ and G⁴ to a cross head O, mounted to slide vertically in guideways I⁴ arranged on the main frame I, and the upper end of the cross head O is connected by a link O' with a lever O² fulcrumed on the main frame I and carrying a weight O³ adjustably secured on the lever by a set screw O⁴. The knife G' is arranged similarly to the stripping knives E² and C², and the fibers, while drawn between the edge of the knife G' and the top of the block G², are pressed on sufficiently heavily by the cutting edge to scrape off any gummy matter or other moisture that may adhere to the fibers. It is understood that the pulp, covering, sap and gummy matter removed from the material during the successive actions of the stripping device C, combing device D, stripping device E, cleaning and polishing device F, and scraping and drying device G drops down into a suitable vessel P attached to the main frame I and provided with a valved outlet P' for drawing off the sap and gummy matter from time to time.

In order to successively raise the cross heads L', N' and O for the passage of the draw-head B, the said cross heads are provided, at their sides, with cams L⁶, N⁶ and O⁵, respectively, adapted to be engaged by friction rollers B⁷ held on the trunnions B² of the draw-head B, so that when the latter is drawn along by the arms K⁵ of the sprocket chains K², then the said friction rollers B⁷ come in contact with the cams L⁶, N⁶ and O⁵ to raise the corresponding cross heads L', N' and O, to allow the draw-head B to pass under the several devices C, D, E, F and G, to bring the material between the members of the several devices, as above explained. The forward ends of the cams L⁶, N⁶ and O⁵ are arranged to permit the friction rollers B⁷ to quickly raise the cross heads L', N' and O, while the rear ends of the said cams are formed to allow a gradual or slow downward movement of the cross heads, to prevent injury to the working parts of the devices. Each of the cross heads L', N' and O is, in addition, spring supported, and for this purpose each cross head, when moving into a lowermost position, engages springs Q (see Fig. 7) supported on screw rods Q' screwing in the sides of the main frame I.

From the foregoing it will be seen that when the cross heads L', N' and O move downward by their own weights and those of the weighted levers L³, N³ and O², it is evident that the cross heads are cushioned on striking the springs Q, and consequently the stripping knives C², E² and G', as well as the plates F', F², F³ and F⁴ are not liable to injure the fibers of the material.

In order to disengage the draw-head B from the arms K⁵ of the conveyer chains K², and to rotate the roller B³ for winding up the fibers and the apron H after the draw-head B has passed the scraping and drying device G, the following arrangement is made:

On the trunnions B² of the draw-head B are secured pinions B⁸, adapted to mesh with gear wheels R secured on the main driving shaft J, the upper portions of the gear wheels R extending a distance above the conveyer chains K², as plainly indicated in Fig. 2. Now, when the machine is in motion and the conveyer chains K² carry the draw-head B rearward, then the pinions B⁸ finally come in contact and mesh with the gear wheels R, so that the latter carry the pinions B⁸, and consequently the draw-head B bodily upward, it being understood that the draw-head B is prevented from revolving by the arms K⁵ engaging the polygonal portions B' of the trunnions B². When the draw-head B about reaches the top of the gear wheels R, then the upper ends of the arms K⁵ disengage the polygonal portions B', so that a further rearward carrying of the draw-head B ceases. In order to hold the draw-head B in this uppermost position, and to allow of rotating the draw-head B with a view to wind up the fibers and the apron H, cams S are provided, secured on a shaft S' journaled in suitable bearings arranged on brackets I⁵ forming part of the main frame I. The cams S are provided with cam surfaces S², adapted to be engaged by the trunnions B² at the time the draw-head B nears the gear wheels R (see Fig. 1); and when the trunnions B² engage the said cam surfaces S², and the draw-head B is moved rearwardly and upwardly by the action of the gear wheels R, then the cams S are turned and the trunnions B² finally pass into bearings S³ at the inner ends of the cam surfaces S². The trunnions B² engage the bearings S³ at the time the draw-head B is in an uppermost position, so that the draw-head B is free to revolve, and is driven by the gear wheels R, to wind up the fibers and the apron H.

In order to lock the cams S against turning at the time the trunnions B² engage the bearings S³, arms T are provided, adapted to engage shoulders S⁴ formed on the cams S adjacent to the bearings S³. The arms T are secured on a transversely-extending shaft T' journaled in suitable bearings on the main frame I, and on one end of the said shaft T' (See Fig. 1) is secured a gear wheel T² in mesh with a pinion T³ secured on a shaft T⁴ mounted to turn in bearings on the frame I. On the shaft T⁴ is fastened a hand lever T⁵ under the control of the operator, also controlling a locking lever T⁶ held on the hand lever T⁵ and engaging a notched segment T⁷ secured on the frame I. Now, when the draw-head B moves into its uppermost position on the gear wheels R and the cams S support the trunnions B² by their bearings S³, then the operator unlocks the hand lever T⁵ and swings the same upward, so as to swing the arms T in a like direction, to engage the shoulders S⁴, thus locking the cams S against turning. When the fibers have been completely wound up on the roller B³ of the draw-head B, together with the apron H, then the operator imparts a further upward swinging motion to the hand lever T⁵, to cause the arms T to turn the cams S, so that the draw-head B is lifted upward by the bearings S³ to disengage the pinions B⁸ from the gear wheels R and to bring the trunnions B² in alinement with the upper surface of a skid U secured on the main frame I. The trunnions B² now readily roll out of the bearings S³ onto the skid U, to travel down the same, and to finally come to a stop at the lower, upwardly curved end U' of the skid U. The draw-head B with the fibers and apron H wound thereon, can now be lifted off the machine for removal of the fibers and apron, to permit re-use of the draw-head B at the front end of the machine after another piece of material A is clamped in the draw-head. The apron H unwinds from a spool H' journaled in suitable bearings on the brackets I⁵, the free end of the apron H being inserted between the fibers and the peripheral face of the roller B³ of the draw-head B at the time the latter nears the gear wheels R.

In order to properly support the upper run of the conveyer chain K, suitable guideways K⁶ are provided, supported on brackets I⁶ attached to the sides of the frame I.

In order to support the material A previous to its passage between the first stripping device C, a suitable table V is arranged on the front end of the machine.

The operation is as follows: A draw-head B with the end A⁴ of the material A clamped therein is placed in the bearings I' at the front end of the machine, so that the material rests on the table V and extends from the under side of the draw-head B. Now, when the machine is running, a pair of arms K⁵ of the traveling chains K² engage the polygonal portions B' of the trunnions B² of the draw-head B and move the latter bodily forward without turning as the arms K⁵ engage the straight sides of the polygonal portions B'. The rollers B⁷ of the draw-head B finally engage the cams L⁶ and lift the cross head L', to allow the draw-head B to pass under the stripping knife C² and the combing device D, thereby bringing the material A between the stripping knives C' and C² and below the combing device D. The rollers B⁷, on leaving the rear ends of the cams L⁶, allow the cross head L' to move downward, and in doing so the material A is acted on by both stripping knives C' and C² so as to remove the main portion of the pulp A² and coating A³ of the material A by stripping the same off opposite sides of the fibers A' lying side by side, with some pulp material between individual fibers, thus leaving a web or band. This band or web of fibers is pierced by the teeth of the several combs D', D², D³ and D⁴ of the combing device D, to gradually split the band or web into narrow strips, the rear comb D⁴ being sufficiently fine to divide the entire band or web into very narrow strips. The draw-head B, in the meantime, causes a raising of the cross head N' by the action of the rollers B⁷ on the cams N⁶, so that the draw-head B passes underneath the stripping knife E² and the plates F', F², F³ and F⁴, and the cross head N' finally returns to its lowermost position, so that the stripping knives E' and E² now act on the narrow strips to break up the strips and loosen and separate the individual fibers, at the same time removing any woody portions or pulp that adhere to the separate fibers, and loosened or broken up by the knives E' and E². The fibers, after leaving the stripping knives E' and E², pass between the corresponding plates F', F², F³ and F⁴ and their screw rods F⁵, F⁶, F⁷ and F⁸, so that the fibers are cleaned and polished and also straightened and rounded. The draw-head B, in its further movement, causes a raising of the cross head O, so that the fibers pass between the knife G' and the elastic block G², and when the rollers B⁷ of the draw-head B have left the rear end of the cams O⁵, then the knife G' firmly presses the fibers against the elastic block G² so that any sap, gum, moisture or the like on the fibers is scraped off or pressed out of the fibers. The draw-head B is now elevated by the action of the pinions B⁸ meshing with the gear wheels R, so that the arms K⁵ disengage the polygonal portions B' of the draw-head and pass on, while the draw-head B is held in this raised position by the cams S, locked in place by the arms T, as previously explained. When the draw-head B moves into an uppermost position, the end of the apron H is passed between the fibers and the peripheral surface of the roller B³ of the draw-head B, so that when the draw-head is rotated by the gear wheels R, then the fibers are wound up on the roller B³, together with the apron H, and at the same time the remaining portion of the material is drawn through the different devices C, D, E, F and G, to cause a complete separation, cleaning, polishing and drying of the fibers, as above explained.

From the foregoing it will be seen that the leaf sheath or band-like material is subjected, in proper sequence, to the action of the several devices C, D, E, F and G to first remove the major portion of the spongy pulp A² and the coating A³ from the material and form a band of connected or adhering fibers, and this band is then gradually split into a plurality of narrow strips of connected or adhering fibers, and the several strips are then acted on to separate the individual fibers, which are then cleaned, polished and dried and wound up in this condition and without danger of entanglement of the individual fibers. It is understood that in practice the draw-head roller B³ is of sufficient length to accommodate, side by side, a large number of the leaf sheaths or band-like materials A, all treated simultaneously in the manner described, to obtain a large amount of fibers on each passage of the draw-head B through the machine.

When the ends of the fibers have been wound up, together with the apron H, then the operator causes a further elevation of the draw-head B by the cams S, acted on by the arms T, so that the draw-head B, with the fibers and apron H thereon, rolls down the skid U, to be finally removed from the lower end thereof. It is understood that by using the apron H the fibers are prevented from entangling or curling up while being wound on the roller B³, and hence the fibers are kept perfectly straight and are not liable to discolor.

It is understood that when the end of the material has passed through the first stripping device C and the combing device D, then another draw-head B with a new piece of material attached thereto is placed in position on the bearings I', and the above-described operation is then repeated. Thus a second draw-head B may be moving forward in the machine at the time the first one winds up the ends of the fibers, and hence a large amount of material can be treated in a comparatively short time.

In treating material having exceedingly fine fibers, it is desirable to dispense with the knives C' and E' of the stripping devices C and E, and to use, instead of the knives, rollers C⁵ (see Fig. 12), each operating in conjunction with a stripping knife C⁶ adjustably secured to the cross head L' or N'. Each roller C⁵ is journaled in bearings C⁷ held vertically adjustable, by the use of set screws C⁸, in guideways I⁷ arranged on the main frame I.

In order to conveniently and quickly form the reduced end A⁴ of the material A, I prefer to employ a reducing device W, illustrated in Fig. 13, and which consists of a table W' provided, at one end, with an abutting flange W² and having standards W³ in which is mounted to swing a knife W⁴. The end of the material is pushed over the table W' in the direction of the arrow b', to cause the knife W⁴ to swing upwardly to rest on the top surface of the material A. Now, when the terminal of the material abuts against the flange W², then the operator pulls on the material A in the inverse direction of the arrow b', so that the cutting edge of the spring knife W⁴ cuts into the pulp portion A² of the material A, to form the reduced end A⁴ thereof, as will be readily understood by reference to Figs. 13 and 14.

Having thus described my invention, I claim as new and desire to secure by Letters Patent:—

1. A machine for separating the fibers from the pulp, coating and other extraneous matter of plant or tree material, comprising means for removing the pulp and coating from opposite sides of the fibers to leave a band of connected fibers, means for dividing the band of fibers into narrow strips of connected fibers, means for separating the individual fibers in each strip, means for cleaning and polishing the individual fibers, means for drying the fibers, and means for winding up the separate, cleaned and dried fibers together with an apron.

2. A machine for separating fibers from the pulp of plant or tree material, provided with means for separating the fibers and pulp, a draw-head for drawing the material through the said separating means and for winding up the fibers, and an apron winding with the fibers on the draw-head to separate the fiber layers and keep the same from curling up and entangling.

3. A machine for separating fibers from the pulp of plant or tree material, provided with a draw-head for winding up the fibers, and means for keeping the fiber layers separate on the draw-head.

4. A machine for separating fibers from a band like material, comprising means for simultaneously removing the pulp and the outer coating of the material, means for dividing the material into narrow strips, means for loosening the fibers of the strips, means for cleaning, polishing and straightening the fibers, and means for winding up the separated fibers.

5. A machine for separating fibers from the pulp of plant or tree material, provided with a stripping device having a pair of inclined stripping knives, the cutting edges of which are spaced apart and arranged opposite each other, a plurality of combs adjacent to each other and in the rear of the said pair of stripping knives, and means for drawing the material between the said cutting edges and through the said combs.

6. A machine for separating fibers from the pulp of plant and tree material, provided with a plate transverse to the direction of movement of the material, a notched bar opposite the said plate, and means for drawing the material between the plate and the notched bar to force the fibers into the notches of said bar.

7. A machine for separating fibers from the pulp of plant or tree material, provided with a series of plates transverse to the direction of movement of the material, a series of notched bars opposite the said plates, the said notched bars having notches of different size, and means for drawing the material between the plates and bars.

8. A machine for separating fibers from the pulp of plant or tree material, provided with a series of plates transverse to the direction of movement of the material, a series of notched bars opposite the said plates, the said notched bars having notches of different size, a notched bar having a larger notch being in front of a notched bar having a notch of less size, and means for drawing the material between the knives and plates.

9. A machine for separating the fibers from the pulp of plant or tree material, provided with a fiber cleaning and polishing device through which the material is drawn, comprising a plate transverse to the direction of the movement of the material, a notched bar opposite the stripping edge of the plate, and means for drawing the material between the plate and notched bar.

10. A machine for separating the fibers from the pulp of plant or tree material, provided with a fiber cleaning and polishing device through which the material is drawn, comprising a series of spaced plates, a series of notched bars opposite the stripping edges of the said plates, and means for drawing the material between the plates and notched bars.

11. A machine for separating the fibers from the pulp of plant and tree material, provided with a fiber cleaning and polishing device through which the material is drawn, comprising a series of spaced plates, a series of notched bars opposite the stripping edges of the said plates, the notches of the notched bars being graduated, and means for drawing the material between the plates and notched bars.

12. A machine for separating the fibers from the pulp of plant or tree material, provided with a fiber cleaning and polishing device through which the material is drawn, comprising a series of spaced plates, a series of notched bars opposite the stripping edges of the said plates, the notches of the notched bars being graduated, each notched bar having notches of less size than the bar immediately in front, and means for drawing the material between the plates and notched bars.

13. A machine for separating the fibers from the pulp of plant or tree material, provided with a fiber cleaning and polishing device through which the material is drawn, comprising a series of spaced plates, a series of notched bars opposite the stripping edges of the said plates, means for drawing the material between the plates and notched bars, and means for adjusting the said notched bars relative to the said plate.

14. A machine for separating the fibers from the pulp of plant or tree material, comprising in combination spaced stripping devices, a combing device intermediate the said stripping devices, a cleaning and polishing device in the rear of the second stripping device, and means for drawing the material through the said devices.

15. A machine for separating the fibers from the pulp of plant or tree material, comprising in combination spaced stripping devices, a combing device intermediate the said stripping devices, a cleaning and polishing device in the rear of the second stripping device, a fiber-drying device in the rear of the said cleaning and polishing device, and means for drawing the material through the said devices.

16. A machine for separating the fibers from the pulp of plant or tree material, comprising in combination spaced stripping devices, a combing device intermediate the said stripping devices, a cleaning and polishing device in the rear of the second stripping device formed of plates and graduated notched bars, and means for drawing the material through the said devices.

17. A machine for separating the fibers from the pulp of plant or tree material, comprising in combination spaced stripping devices, a combing device intermediate the said stripping devices, a cleaning and polishing device in the rear of the second stripping device, a fiber-drying device in the rear of the said cleaning and polishing device consisting of a yielding block and a stripping knife operating in conjunction with the block, and means for drawing the material through the said devices.

18. A machine for separating the fibers from the pulp of plant or tree material, comprising in combination spaced stripping devices, a combing device intermediate the said stripping devices and having a series of graduated combs one in front of the other, a cleaning and polishing device in the rear of the second stripping device, and means for drawing the material through the said devices.

19. A machine for separating the fibers from the pulp of plant or tree material, comprising separating devices for separating the fibers from the pulp, an endless carrier chain having arms mounted to travel lengthwise of the machine, a draw-head having means for clamping one end of the material in place, the said draw-head being adapted to be engaged by the said arms for moving the draw-head bodily along to draw the material through the said separating devices, the said draw-head being in the form of a roller, and means for disengaging the said draw-head from the arms of the carrier chain after the draw-head has passed the said separating devices.

20. A machine for separating the fibers from the pulp of plant or tree material, comprising separating devices for separating the fibers from the pulp, an endless carrier chain having arms and mounted to travel lengthwise of the machine, a draw-head having means for clamping one end of the material in place, the said draw-head being adapted to be engaged by the said arms for moving the draw-head bodily along to draw the material through the said separating devices, the said draw-head being in the form of a roller, means for disengaging the said draw-head from the arms of the carrier chain after the draw-head has passed the said separating devices, and means for rotating the draw-head after it is disengaged from the said carrier.

21. A machine for separating the fibers from the pulp of plant or tree material, comprising separating devices for separating the fibers from the pulp, an endless carrier chain having arms and mounted to travel lengthwise of the machine, and a draw-head in the form of a roller having trunnions adapted to be engaged by the said carrier arms, the roller having means for clamping one end of the material in place.

22. A machine for separating the fibers from the pulp of plant or tree material, comprising separating devices for separating the fibers from the pulp, an endless carrier chain having arms and mounted to travel lengthwise of the machine, a draw-head in the form of a roller having trunnions adapted to be engaged by the said carrier arms, the roller having means for clamping one end of the material in place, pinions on the said trunnions, and driven gear wheels in the rear of the said separating devices adapted to be engaged by the said pinions.

23. A machine for separating the fibers from the pulp of plant or tree material, comprising separating devices for separating the fibers from the pulp, an endless carrier chain having arms and mounted to travel lengthwise of the machine, a draw-head in the form of a roller having trunnions adapted to be engaged by the said carrier arms, the roller having means for clamping one end of the material in place, pinions on the said trunnions, and driven gear wheels in the rear of the said separating devices adapted to be engaged by the said pinions, the said gear wheels extending above the top of the said carrier chain to lift the draw-head out of engagement with the carrier chain and to rotate the drawing roller.

24. A machine for separating the fibers from the pulp of plant or tree material, comprising separating devices for separating the fibers from the pulp, an endless carrier chain having arms and mounted to travel lengthwise of the machine, a draw-head in the form of a roller having trunnions adapted to be engaged by the said carrier arms, the roller having means for clamping one end of the material in place, pinions on the said trunnions, driven gear wheels in the rear of the said separating devices adapted to be engaged by the said pinions, the said gear wheels extending above the top of the said carrier chain to lift the draw-head out of engagement with the carrier chain and to rotate the drawing roller, and revoluble cams having bearings engaged by the said trunnions to allow rotation of the draw-head by the gear wheels and pinion in mesh with each other.

25. A machine for separating the fibers from the pulp of plant or tree material, comprising separating devices for separating the fibers from the pulp, an endless carrier chain having arms and mounted to travel lengthwise of the machine, a draw-head in the form of a roller having trunnions adapted to be engaged by the said carrier arms, the roller having means for clamping one end of the material in place, pinions on the said trunnions, driven gear wheels in the rear of the said separating devices adapted to be engaged by the said pinions, the said gear wheels extending above the top of the said carrier chain to lift the draw-head out of engagement with the carrier chain and to rotate the drawing roller, revoluble cams having bearings engaged by the said trunnions to allow rotation of the draw-head by the gear wheels and pinion in mesh with each other, and manually controlled means for temporarily holding the said bearing cams against rotation.

26. A machine for separating the fibers from the pulp of plant or tree material, comprising separating devices for separating the fibers from the pulp, an endless carrier chain having arms and mounted to travel lengthwise of the machine, a draw-head in the form of a roller having trunnions adapted to be engaged by the said carrier arms, the roller having means for clamping one end of the material in place, pinions on the said trunnions, driven gear wheels in the rear of the said separating devices adapted to be engaged by the said pinions, the said gear wheels extending above the top of the said carrier chain to lift the draw-head out of engagement with the carrier chain and to rotate the drawing roller, revoluble cams having bearings engaged by the said trunnions to allow rotation of the draw-head by the gear wheels and pinion in mesh with each other, and a skid onto which the draw-head is delivered by the said cams.

27. A machine for separating the fibers from the pulp of plant or tree material, comprising separating devices for separating the fibers from the pulp, an endless carrier chain having arms and mounted to travel lengthwise of the machine, a draw-head in the form of a roller having trunnions adapted to be engaged by the said carrier arms, the roller having means for clamping one end of the material in place, pinions on the said trunnions, driven gear wheels in the rear of the said separating devices adapted to be engaged by the said pinions, the said gear wheels extending above the top of the said carrier chain to lift the draw-head out of engagement with the carrier chain and to rotate the drawing roller, revoluble cams having bearings engaged by the said trunnions to allow rotation of the draw-head by the gear wheels and pinion in mesh with each other, manually controlled means for temporarily holding the said bearing cams against rotation and for turning the cams to lift the draw-head, and a skid onto which the said lifted draw-head is discharged by the said cams.

28. A machine for separating the fibers from the pulp of plant or tree material, provided with a stripping and combing device, comprising a fixed stripping knife, a movable stripping knife opposite the fixed stripping knife, a comb, a cross head mounted to slide and carrying the said movable knife and the said comb, a cam on the cross head, a draw-head having means for engaging the said cam to lift the cross head for the passage of the draw-head underneath the knife and comb held on the cross head, and means for moving the draw-head bodily forward.

29. A machine for separating the fibers from the pulp of plant or tree material, provided with separating devices having fixed and movable members, a draw-head for drawing the material through the said separating devices, means for moving the draw-head along, means on the draw-head and the said movable members for raising the latter, to allow the passage of the draw-head between the fixed and movable members, and spring supports for the said movable members.

30. A machine for separating the fibers from the pulp of plant or tree material, provided with a stripping device having a fixed knife, a movable knife, and a spring support for the movable knife.

31. A machine for separating the fibers from the pulp of plant or tree material, provided with a fiber separating device having a fixed member and a member mounted to slide toward and from the said fixed member, and a spring support for the said movable member.

32. In a machine for separating fibers from the pulp of plant or tree material, the combination with means for separating and cleaning the fibers from the pulp, of a roller carrier for the material, means for operating the carrier to move it through the machine, and means for disengaging the roller from its operating means.

33. In a machine for separating fibers from the pulp of plant or tree material, the combination with means for separating and cleaning the fibers from the pulp, of a roller carrier, means for operating the carrier to move it through the machine, means for disengaging the roller from its operating means, means for supporting the roller thus disengaged, and means for rotating said roller to wind the fibers thereon.

34. In a machine for separating fibers from the pulp of plant or tree material, the combination with devices for separating and cleaning the fibers, of a roller carrier having gear wheels at its ends, means for moving the roller carrier through the machine, gear wheels with which the gear wheels of the roller carrier engages when it has been moved through the machine whereby the roller carrier will be disengaged from its operating means and rotated, and means for engaging the journals of the roller carrier when elevated to support and permit it to be rotated.

35. In a machine for separating fibers from the pulp of a plant or tree material, the combination with devices for separating and cleaning the fibers, of a roller carrier for the material provided with gear wheels at its ends, an endless carrier chain with which the carrier roller is held in detachable engagement to be moved thereby, a notched cam to receive the trunnions of the roller carrier, means for operating the said cam, and gear wheels for engaging the gear wheels of the roller carrier to disengage it from the endless chain and rotate it while held in the notch of the cam.

36. In a machine for separating fibers from the pulp of plant and tree material, a pair of oppositely arranged knives for removing the pulp and outer coating from the material, a sliding support for one of the knives, combs carried by the support, a carrier for the material, means for operating the carrier, and means for operating the support from the carrier.

37. A machine for separating fibers from the pulp of plant and tree material, comprising oppositely arranged knives for removing the pulp and outer coating from the material, a vertically movable support for one of the knives, combs carried by the support, a second set of oppositely arranged knives, a vertically movable support for one of the knives, plates carried by the support, notched bars opposite the plates, a vertically movable support, a scraper carried by the support, a block with which the scraper coacts, a carrier, means for operating the carrier for the material, and means for operating the supports from the carrier.

In testimony whereof I have signed my name to this specification in the presence of two subscribing witnesses.

EUGENE BEHRENDT.

Witnesses:
 THEO. G. HOSTER,
 EVERARD B. MARSHALL.